United States Patent [19]

Sanderson

[11] 4,153,402
[45] May 8, 1979

[54] INJECTION APPARATUS CONTROL

[75] Inventor: Clifford Sanderson, Belleville, Canada

[73] Assignee: Bata Shoe Company, Inc., Belcamp, Md.

[21] Appl. No.: 896,187

[22] Filed: Apr. 14, 1978

[30] Foreign Application Priority Data

May 2, 1977 [CA] Canada ................................. 277382

[51] Int. Cl.² ........................................... B29F 1/03
[52] U.S. Cl. .................................. 425/145; 425/119; 425/129 S; 425/256; 425/166
[58] Field of Search ....................... 425/145, 119, 129 S

[56] References Cited

U.S. PATENT DOCUMENTS

| 3,328,845 | 7/1967 | Ludwig | 425/129 S X |
| 3,425,095 | 2/1969 | Kotek | 425/145 X |
| 3,765,809 | 10/1973 | Farrell | 425/145 X |
| 3,884,608 | 5/1975 | King | 425/145 |
| 3,924,995 | 12/1975 | Crooks et al. | 425/129 S X |
| 3,941,534 | 3/1976 | Hunker | 425/145 |
| 4,075,301 | 2/1978 | Oswald | 425/145 X |
| 4,120,630 | 10/1978 | La Spisa et al. | 425/145 X |

Primary Examiner—J. Howard Flint, Jr.
Attorney, Agent, or Firm—Holman & Stern

[57] ABSTRACT

An injection control apparatus for controlling the quantity of extrudable material dispensed by the screw of an extruder into a series of molds includes a code device attached to each mold or the mold carrier, the code device including magnets indicative of the volume of the mold cavity to be filled; sensors in the form of Hall effect switches for triggering by the magnets when in close proximity thereto and for generating a code signal which is fed to and stored in a controller; a rectilinear position transducer mechanically coupled to the screw of the extruder for sensing the position of the screw and producing a position signal; a logic circuit for receiving the code signal from the memory; potentiometers for receiving a signal from the logic circuit and feeding a reference signal via the logic circuit to a null point detector for comparison with the position signal from the transducer to produce a command signal, which controls dispensing of extrudable material by the screw, i.e., the shot size. By employing only one comparator for a plurality of different shot sizes, the cost of control is drastically reduced.

6 Claims, 5 Drawing Figures

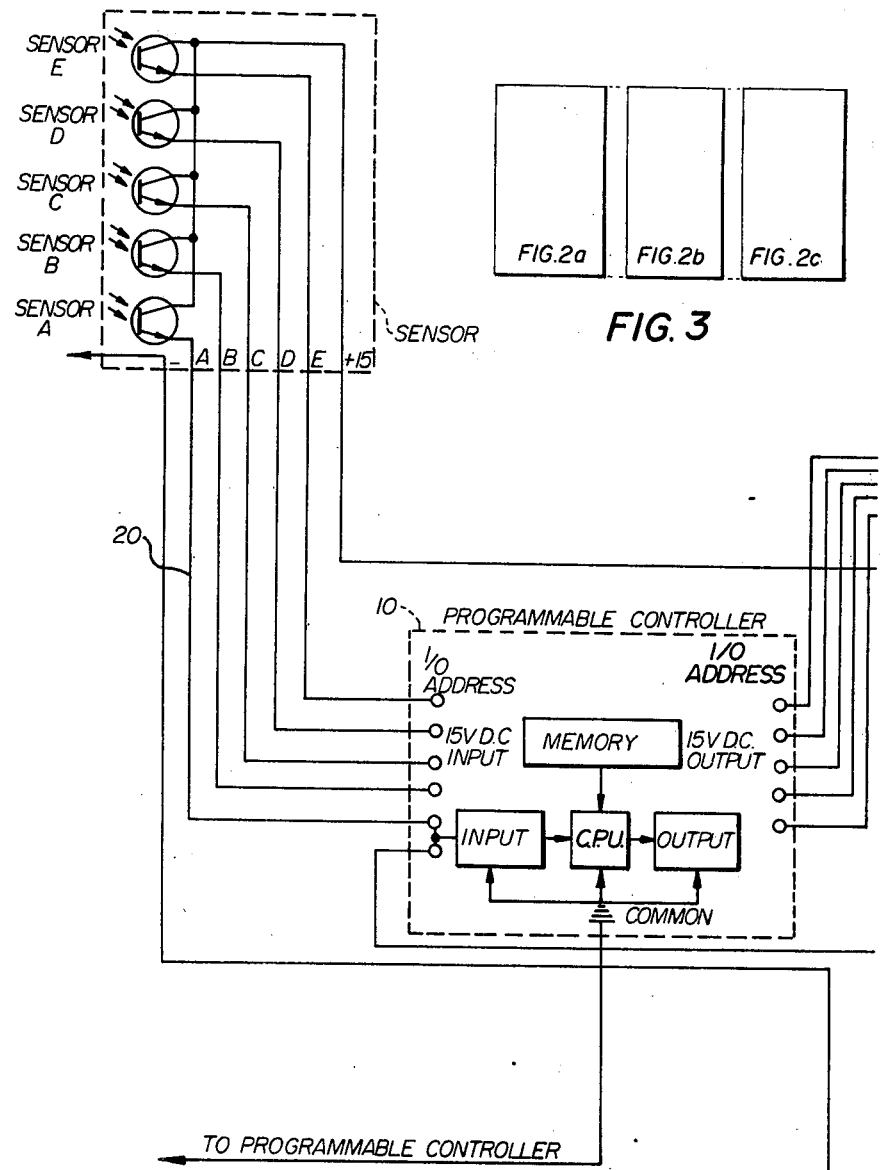
FIG. 3
FIG. 2A
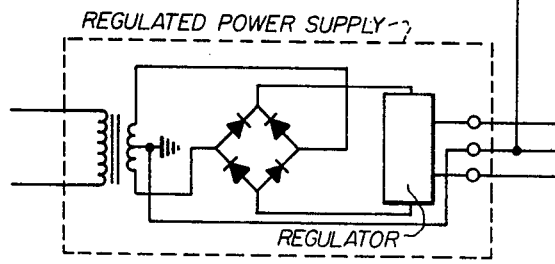

INJECTION APPARATUS CONTROL

BACKGROUND OF THE INVENTION

1. Field of the Invention

This invention relates to an injection control apparatus.

More specifically, the invention relates to an apparatus for controlling extruders used to fill a mold or a portion thereof with a predetermined quantity of a thermoplastic material.

2. Description of the Prior Art

There are presently available many such injection control apparatuses, for example, those disclosed by U.S. Pat. Nos. 3,647,309, which issued to R. H. Thompson on Mar. 7, 1972 and 3,865,528 which issued to L. G. Roess on Feb. 11, 1975.

The apparatus of the first mentioned U.S. patent is intended to control moving parts of an injection molding machine using sensing potentiometers having sliding contacts mechanically connected to the moving parts for producing sensing voltages varying linearly with movement of such parts. Reference voltages are compared with the sensing voltages to actuate solenoids or other controls for initiating and terminating various functions of the molding machine.

The Roess patent discloses an electronic interpolator for effecting relative movement between a die head and pintle to provide a variable orifice through which extrudable material is forced to form a parison of controlled wall thickness. The patent contemplates generating a continuously variable signal by an electrical transducer slaved to some movable element of the apparatus. Two or more programs may be serviced by a single electronic interpolator means for simultaneous control of a corresponding number of separate functions.

Even though such apparatus are available, there exists a need for a simple injection control apparatus, which accurately controls the shot size, i.e., the quantity of material dispensed by an extruder into moving molds during each extrusion operation.

The object of the present invention is to provide a relatively simple injection control apparatus for effectively controlling the quantity of material dispensed by an extruder in accordance with the volume of the mold cavity.

SUMMARY OF THE INVENTION

Accordingly, the present invention relates to an injection control apparatus for controlling the quantity of extrudable material extruded from an extruder into a mold including a code device for attachment to said mold, the code device being indicative of the volume of the mold cavity in said mold to be filled with the extrudable material; a sensing device for triggering by said code device when in close proximity thereto; a controller for receiving and storing a code signal from said sensing device; transducer means coupled to the extruder metering device for sensing the position of the extruder metering device and producing a position signal indicative of such position; logic means for receiving signals from said controller; a control device for receiving a signal from said logic control means, comparator means for receiving said position signal from said transducer means and a reference signal from said control device dependent on the code signal from said logic control means to produce a command signal for controlling the feed of extrudable material by said extruder metering device.

Unlike the prior art devices, the apparatus of the present invention employs a single comparator for controlling a plurality of shot sizes. Thus, the cost of effectively controlling injection is relatively low.

A specific application of the apparatus of the present invention is in the injection molding of footwear articles, or in the filling of heel cavities in a slush molding process using an extruder and related apparatus as described in patent application Ser. No. 925,842, filed July 18, 1978. The apparatus in question includes an extruder rotatably mounted on a carriage for movement towards and away from a conveyor carrying a plurality of mold carriers, and molds on the carriers spaced equidistant apart on the conveyor. A cam device at the front of the frame supporting the extruder and carriage causes the nozzle of the extruder to follow a straight line path of travel above the individual molds during a heel filling operation. The nozzle of the extruder dispenses a shot of thermoplastic material downwardly into the heel cavity of each mold during travel of the nozzle above the mold. In order to prevent scorching of the extruder barrel, it is essential to purge the extruder when no mold is present on a mold carrier, i.e., a dispensing step must occur at frequent intervals. The apparatus is also equipped with a piston/cylinder arrangement for moving the carriage and extruder rapidly away from the conveyor for manual purging and shutting down of the apparatus.

When using the injection control apparatus of the present invention in an extrusion apparatus of the type described in the above-mentioned application, the transducer means is a linear transducer mechanically connected to the screw of the extruder. The code device is mounted on each mold carrier, and the sensing device is mounted on the frame of the slush molding machine. Immediately prior to each heel filling operation, the code device on a mold carrier comes into close proximity to the sensing device, feeding a signal to the controller; thus initiating an extrusion control operation. The code device includes a plurality of movable magnets, which are manually set to indicate the size of the heel cavity. The sensing device includes a plurality of sensors, one for each code device, for providing a signal indicative of the volume of the heel cavity. Alternatively, a single set of magnets is provided at a heel filling location, and pre-settable cams are installed on each carriage for operating selected of the magnets. This reduces the cost of the apparatus, since only one set of magnets is used instead of one set for each mold carrier.

After passing the code device, the mold passes a photo-sensor which detects the position of the heel. A light source is provided for intercepting the path of travel of the heel of the mold. When the photo-sensor is occluded by a heel, a synchronous movement of the extruder nozzle with the mold is effected.

Regardless of whether a mold is present, the extruder dispenses a shot of thermoplastic material. For such purpose, a separate switch device is provided on the machine frame downstream of the photo-sensor in the direction of travel of the molds and mold carriers. The switch device is actuated by a mold carrier after it passes the photo-sensor to trigger operation of the extruder.

BRIEF DESCRIPTION OF THE DRAWINGS

FIG. 3, which appears on the second sheet of drawings, is a layout of parts a, b and c of FIG. 2.

DESCRIPTION OF THE PREFERRED EMBODIMENT

Figure 1:
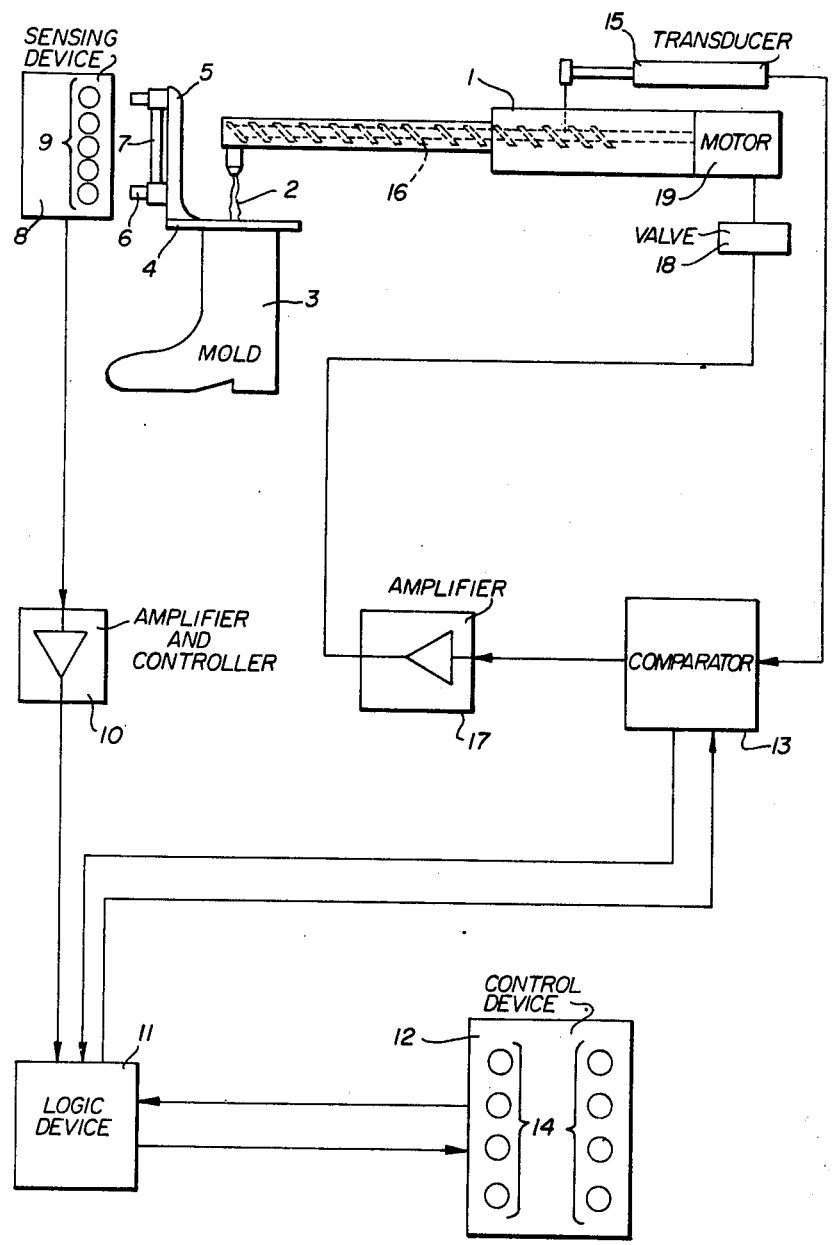
FIG. 1 is a schematic illustration of an injection apparatus for filling the heel cavity of an article of footwear, a preferred embodiment of the injection control apparatus of the present invention being shown in block diagram form.

With reference to FIG. 1, the injection control apparatus of the present invention is intended for use with an extruder 1 for injecting a shot 2 of thermoplastic material into a mold 3 in the shape of a calf-length boot for filling the heel cavity of the mold. The mold 3 is mounted on a mold carrier 4, which is connected to a conveyor (not shown) for carrying molds from one processing operation to the next in a continuous boot forming operation. Each mold carrier 4 is provided with a shot size code device 5, which includes a plurality of movable magnets 6. The magnets 6 can be set manually to indicate the size of the mold 3 carried by the carrier 4. In order to set the magnets 6, they are rotated into or out of position on a shaft 7.

As the mold 3 travels with the conveyor to the heel filling location, the code device 5 comes into close proximity with a sensing device 8. The sensing device 8 is a plurality of Hall effect switches 9, one for each magnet 6 of the code device 5. The extruder is actuated by a photo-cell that detects the position of the heel. A light source is provided in the path of travel of the heel of the mold for starting synchronous movement of the nozzle device with the mold. At least one of the magnets 6 is always in position for sensing by a switch 9, to ensure that the extruder 1 is programmed for dispensing a shot of thermoplastic material of predetermined size each time a mold carrier 4 reaches the heel filling location. Synchronous movement of the mold and extruder is effected by a photo-sensor (not shown) which detects the position of a heel, and the dispensing operation is initiated by a separate switch (not shown) downstream of the sensing device 8 and the photo-sensor. By dispensing a shot of thermoplastic material at regular intervals, scorching of the extruder barrel is avoided. If no mold 3 is present on the carrier, the shot of thermoplastic material is merely purged into a waste receptacle (not shown). The amount purged when a mold is not present is the amount pre-set by the code device.

The sensing device 8 is connected to an amplifier and controller 10 which stores the code signal received from the sensing device until required. A code signal from the controller 10 is fed to a logic device 11 which connects a control device 12 via the device 11 to a comparator 13. The control device 12 contains a plurality of potentiometers 14 only one of which is in use at any one time, i.e., connected to the comparator 13. The comparator 13 is also connected to a position transducer 15. The transducer 15 is mechanically coupled to the screw 16 of the extruder for sensing the relative position of the screw and feeding a position signal to the comparator 13. The selection of the potentiometer 14 in the control device 12 is made by the code signal fed from the controller 10. The position signal is fed from the transducer 15 to the comparator 13 and compared with a reference signal from the control device 12 to cause the screw 16 to move until the two signals are in balance. When the signals are in balance, a command signal is sent from the comparator 13 via an amplifier 17 to a valve 18 for operating motor 19 of the extruder to stop movement of the screw 16.

Thus, the quantity of extrudable material discharged by the extruder 1 during each heel filling operation is accurately controlled by the code and sensing devices 5 and 8, respectively in conjunction with the transducer 15.

Figure 2B:
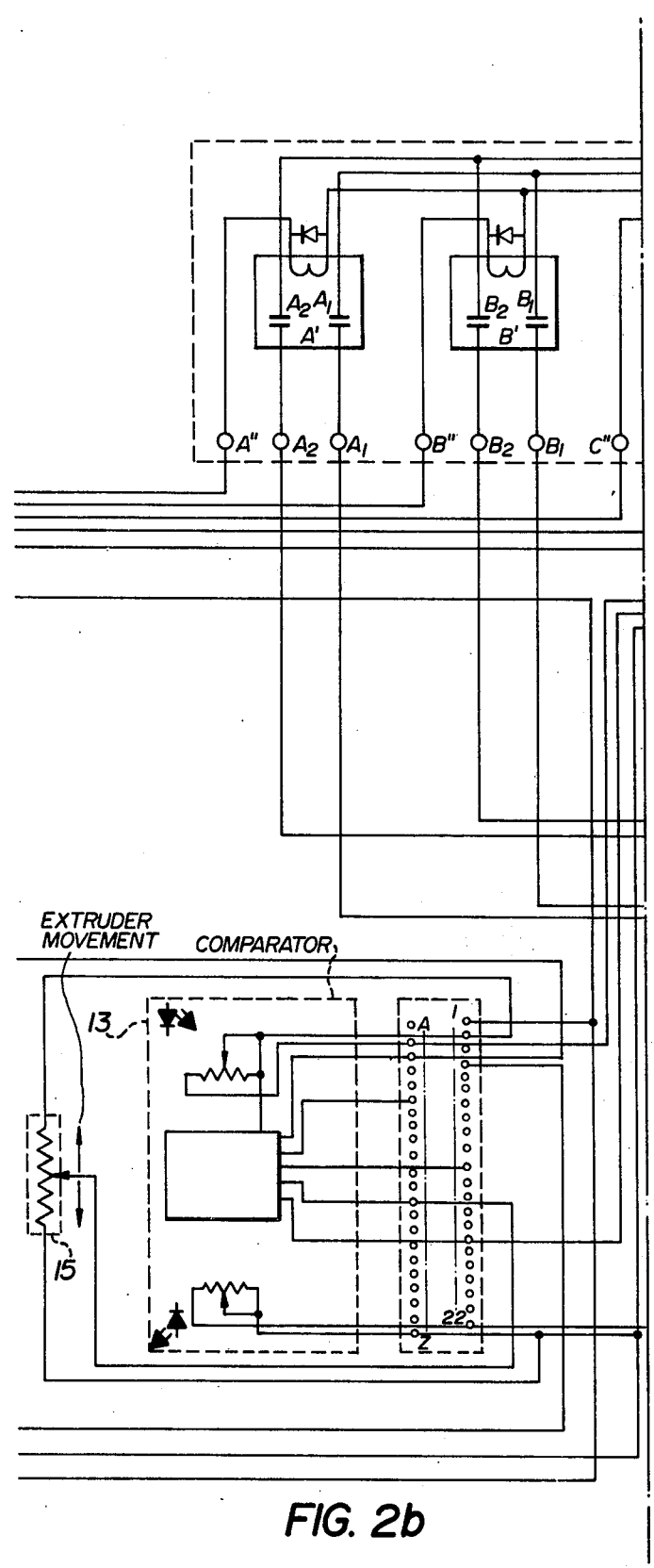
FIG. 2, which appears on three separate sheets, is a circuit diagram of the injection control apparatus of FIG. 1.
Figure 2C:
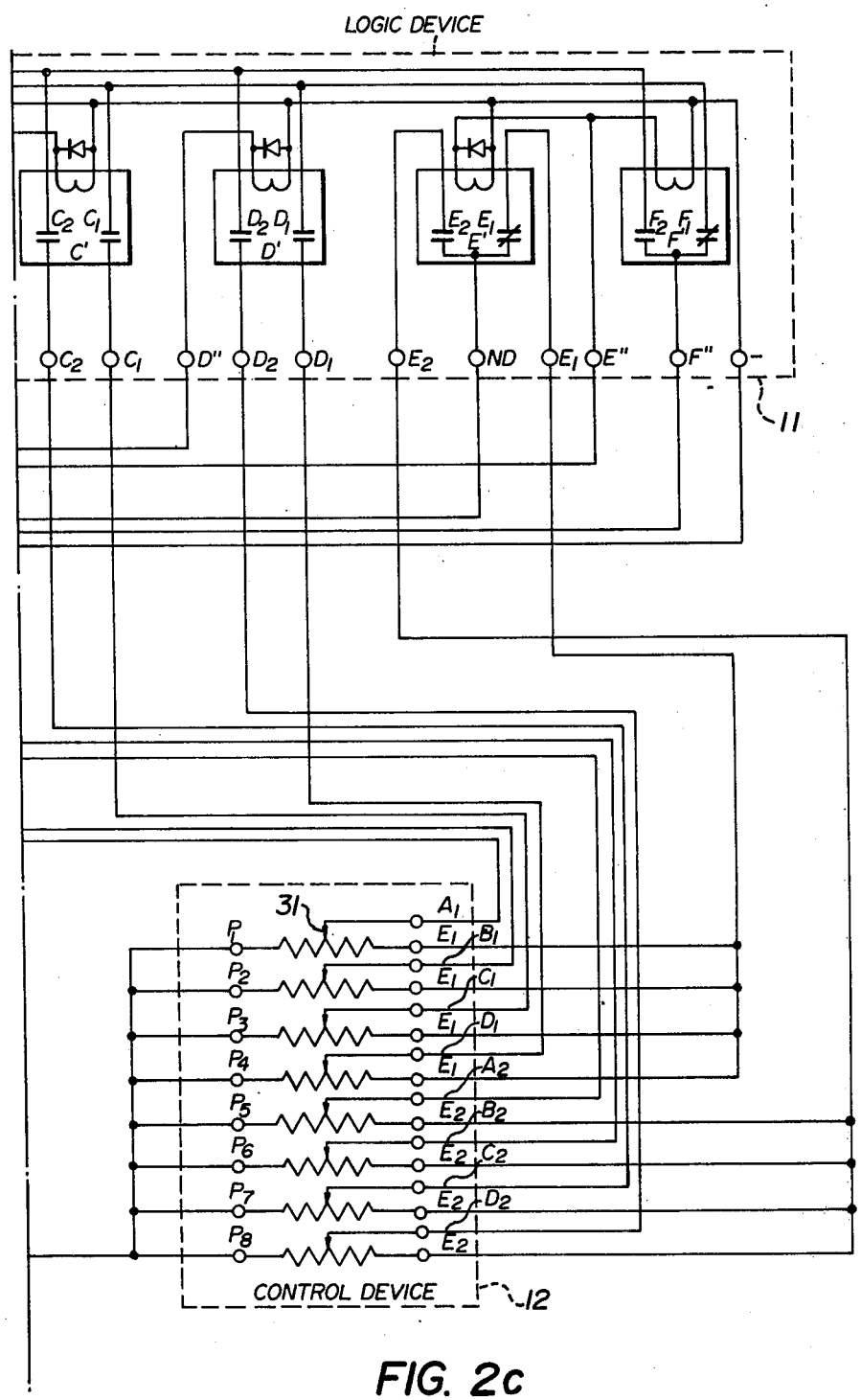

Referring now to FIG. 2, the preferred circuit of the injection control apparatus will now be described. In the circuit of FIG. 2, five sensors A, B, C, D and E are employed in the sensing device 8 for detecting the presence of the movable magnets 6. In this particular case, eight shot sizes are desired, and thus the five sensors are utilized. The eight shot sizes are achieved using the sensors A, B, C and D singly, and in the combinations AE, BE, CE and DE.

Since the circuit is in effect, repeated for each sensor, only one complete circuit will be described. Assuming that the sensor A is energized by one of the magnets 6, a 14 volt DC code signal is applied via conductor 20 to a programmable controller 10, which is essentially a solid state relay logic system. The code signal is stored in the controller 10 until reset by other signals within the logic sequence of the apparatus.

While the code signal is present in the controller 10, an output signal of 15 volts DC is supplied to the logic device 11. The signal is supplied to the coil of reed relay A' at point A" to energize the reed relay A' which closes both sets of normally open contacts $A_1$ and $A_2$. The contact $A_1$ connects the wiping element 31 of a potentiometer $P_1$ to the input of the comparator 13, which is in the form of a null detector circuit, via a normally closed contact $F_1$ of a relay F'. A reference voltage supplied from the null detector is fed to the potentiometers $P_1$, $P_2$, $P_3$, $P_4$ through normally closed contacts $E_1$ of a reed relay E'. The signal voltage level achieved from the setting of the 10 turn potentiometer is then used as a reference voltage that will be compared by the null detector to the output of the linear transducer 15 connected to the screw 16 of the extruder 1.

The moving element of the linear transducer, which is a rectilinear potentiometer, is attached to the screw of the reciprocating screw injection unit of the extruder in such a manner that, as the screw moves back during filling of the area in front of the screw, the position signal voltage level of the transducer 15 approaches that of the reference signal voltage level from the ten turn potentiometer. When the levels are coincident, the null detector 13 provides a 15 volt DC signal which is fed into the controller for preventing additional material from entering the area in front of the screw 16. Thus, the shot size of the next shot to be injected has been determined.

The potentiometers $P_1$ to $P_4$ are connected via the normally closed contacts of the reed relays E' and F'. With this arrangement, it is possible to obtain four separate signal voltage levels from the potentiometers of the control device 12. Therefore, depending on the sensor A-E energized, a different shot size can be effected. By simply energizing the sensor E, the reed relays E' and F' are energized to open contacts $E_1$ and $F_1$ and close contacts $E_2$ and $F_2$. Thus, a reference voltage is supplied from the null detector 14 to potentiometers $P_5$ to $P_8$ via contact $E_2$. The signal voltage level from the potentiometers $P_5$ to $P_8$ is fed through contacts $A_2$–$D_2$, depending on which of the sensors A–D is energized. It is now possible to effect eight different shot sizes, which are controlled by the potentiometers $P_1$ to $P_8$ of the control device 12.

It will be appreciated that the number of different shot sizes can be increased simply by the use of additional sensors, potentiometers and reed relays.

I claim:

1. An injection control apparatus for controlling the quantity of extrudable material dispensed by a metering device of an extruder into a mold comprising a code device for attachment to said mold, the code device being indicative of the volume of a mold cavity in the mold to be filled with the extrudable material; a sensing device for triggering by said code device when in close proximity thereto and for generating a code signal; a controller for receiving and storing said code signal from said sensing device; transducer means coupled to the extruder metering device for sensing the position of the metering device and producing a position signal indicative of such position; logic means for receiving said code signal from said controller; a control device for receiving a signal from said logic means; comparator means for receiving and comparing said position signal from said transducer means and a reference signal from said control device dependent on the code signal to produce a command signal for controlling the quantity of extrudable material dispensed by said metering device.

2. An apparatus according to claim 1, wherein said transducer means is a position transducer and said extruder metering device is a screw of an injection molding extruder.

3. An apparatus according to claim 2, wherein said position transducer is a rectilinear position transducer.

4. An apparatus according to claim 2, wherein the comparator is a voltage null point detector.

5. An apparatus according to claim 2, wherein the comparator is a voltage comparator.

6. An apparatus according to claim 2, wherein said code device is a plurality of magnets connected to said mold, and said sensing device is switches for closing by preselected of said magnets.

* * * * *